United States Patent [19]
Shibuya et al.

[11] Patent Number: 5,803,514
[45] Date of Patent: Sep. 8, 1998

[54] VEHICLE BUMPER MOUNTING STRUCTURE

[75] Inventors: Akihiro Shibuya; Kouji Yamada; Yoshinobu Kanazawa, all of Saitama-ken, Japan

[73] Assignee: Honda Giken Kogyo Kabushiki Kaisha, Tokyo, Japan

[21] Appl. No.: 893,997

[22] Filed: Jul. 17, 1997

Related U.S. Application Data

[63] Continuation of Ser. No. 655,002, May 29, 1996, abandoned.

[30] Foreign Application Priority Data

Jun. 20, 1995 [JP] Japan .................................. 7-153256

[51] Int. Cl.⁶ .................................................. B60R 19/34
[52] U.S. Cl. ................................................ 293/133; 293/132
[58] Field of Search .................................. 188/371, 377; 293/133, 136, 122, 132, 155

[56] References Cited

U.S. PATENT DOCUMENTS

| | | | |
|---|---|---|---|
| 3,998,485 | 12/1976 | Putter et al. | 293/70 |
| 4,408,790 | 10/1983 | Shimoda et al. | 293/122 |
| 4,431,221 | 2/1984 | Jahnle | 293/122 |
| 4,482,180 | 11/1984 | Huber et al. | 293/120 |
| 5,005,887 | 4/1991 | Kelman | 293/120 |
| 5,080,410 | 1/1992 | Stewart et al. | |
| 5,080,411 | 1/1992 | Stewart et al. | 293/122 |
| 5,100,189 | 3/1992 | Futamata et al. | 293/132 |
| 5,114,198 | 5/1992 | Yamashita et al. | 293/120 |
| 5,201,912 | 4/1993 | Terada et al. | 293/120 |
| 5,314,229 | 5/1994 | Matuzawa et al. | 296/189 |

*Primary Examiner*—Gary C. Hoge
*Attorney, Agent, or Firm*—Armstrong, Westerman, Hattori, McLeland & Naughton

[57] ABSTRACT

A structure for mounting a bumper beam 2 extending transversely of a vehicle covered with a bumper face 6 and mounted to a chassis 3 through a support 4, in which the bumper beam 2 is formed into a hollow body made of high-tension steel, the front end of the support 4 extends forward beyond the rear portion of the bumper beam 2. Thus, when a large collision energy works on the lightweight bumper beam formed into a hollow body made of high-tension steel, the collision energy is quickly transferred to the vehicle chassis through the front end of the beam.

8 Claims, 6 Drawing Sheets

VEHICLE BUMPER MOUNTING STRUCTURE

This application is a continuation of application Ser. No. 08/655.002 filed May 29, 1996, now abandoned.

BACKGROUND OF THE INVENTION

1. Field of the Invention

The present invention relates to a vehicle bumper mounting structure and, in particular, to a vehicle bumper mounting structure constituted such that a bumper beam efficiently transfers a large collision energy such as the energy of high-speed (approx. 8 km/hr or more) collision to vehicle chassis.

2. Description of the Related Art

Various types of vehicle bumper mounting structures have been known so far in which a bumper beam extending transversely of a chassis and covered with a bumper face is mounted to the chassis through a support. In general, a bumper is frequently required to absorb a small collision energy such as the energy of low-speed (approx. 8 km/hr or less) collision and to be recoverable. Moreover, a lightweight bumper with improved energy transfer capability has been on demand.

One example of the above type bumpers is disclosed in, for example, U.S. Pat. No. 5,080,410 entitled "Vehicle Bumper Beam". FIGS. 2 and 3 of this reference show a structure in which a bumper beam with a box-type cross section made of high-strength steel is mounted to the front portion of a chassis through a side rail (equivalent to a support).

In general, it is preferable to mount a bumper beam to the center of the side frame of a chassis in its height direction in order to efficiently transfer a large collision energy such as the energy of a high-speed (approx. 8 km/hr or more) collision of a vehicle.

However, there are various restrictions depending on the type of a vehicle and therefore, it may not be possible to mount a bumper beam to the center of a side frame in its height direction. Even in this case, however, it is necessary to quickly and efficiently transfer a collision energy to a chassis.

SUMMARY OF THE INVENTION

It is therefore an object of the present invention to provide a structure capable of quickly and efficiently transferring a collision energy even when a bumper beam is not mounted to the center of a side frame in its height direction.

In the present invention, a bumper beam is formed as a hollow body made from high-tension steel so that the front end of the support extends forward beyond the rear portion of the bumper beam when mounting the bumper beam to a chassis through the support. With this arrangement, when a large impact energy acts upon the lightweight bumper beam, it is possible to quickly transfer the impact energy to the chassis through the front end of the support.

The front end of the support is arranged to be inserted into an opening formed on the rear portion of the bumper beam so that an impact energy can be received by the front end of the support and transferred to the chassis at a relatively early point in time when the bumper beam is deformed due to a large collision energy, thus improving the collision energy transfer characteristic.

The support is composed of a first split half and a second split half designed to be vertically combined therewith. The support is mounted to the front end of the side frame of the chassis. The front end of the first split half is inserted into the opening on the rear portion of the bumper beam made of a high-tension-steel hollow body. The front end of the second split half is mounted along the bottom portion or top portion of the bumper beam. Thus, although the bumper beam is not mounted to the center of the side frame in its height direction, it is possible to quickly and efficiently transfer a large collision energy to a chassis, because the front ends of the first and second split halves receive the collision energy and almost uniformly disperse the collision energy on the side frame when the collision energy is imparted on the bumper beam.

The first split half is composed of a main body and a front end connected thereto, whereby the front end can be separated from the main body of the first split half, thus enabling simplification of the first split half. The top portion and bottom portion of the support are tilted such that they approach each other in the direction of the bumper beam. Thus a collision energy can be transferred in a dispersed fashion to the side frame. Moreover, the cantilever-type support can be prevented from being deflected.

BRIEF DESCRIPTION OF THE DRAWINGS

A preferred embodiment of the present invention will hereinafter be described in detail with reference to the accompanying drawings, in which.

DETAILED DESCRIPTION OF THE PREFERRED EMBODIMENT

Figure 1:
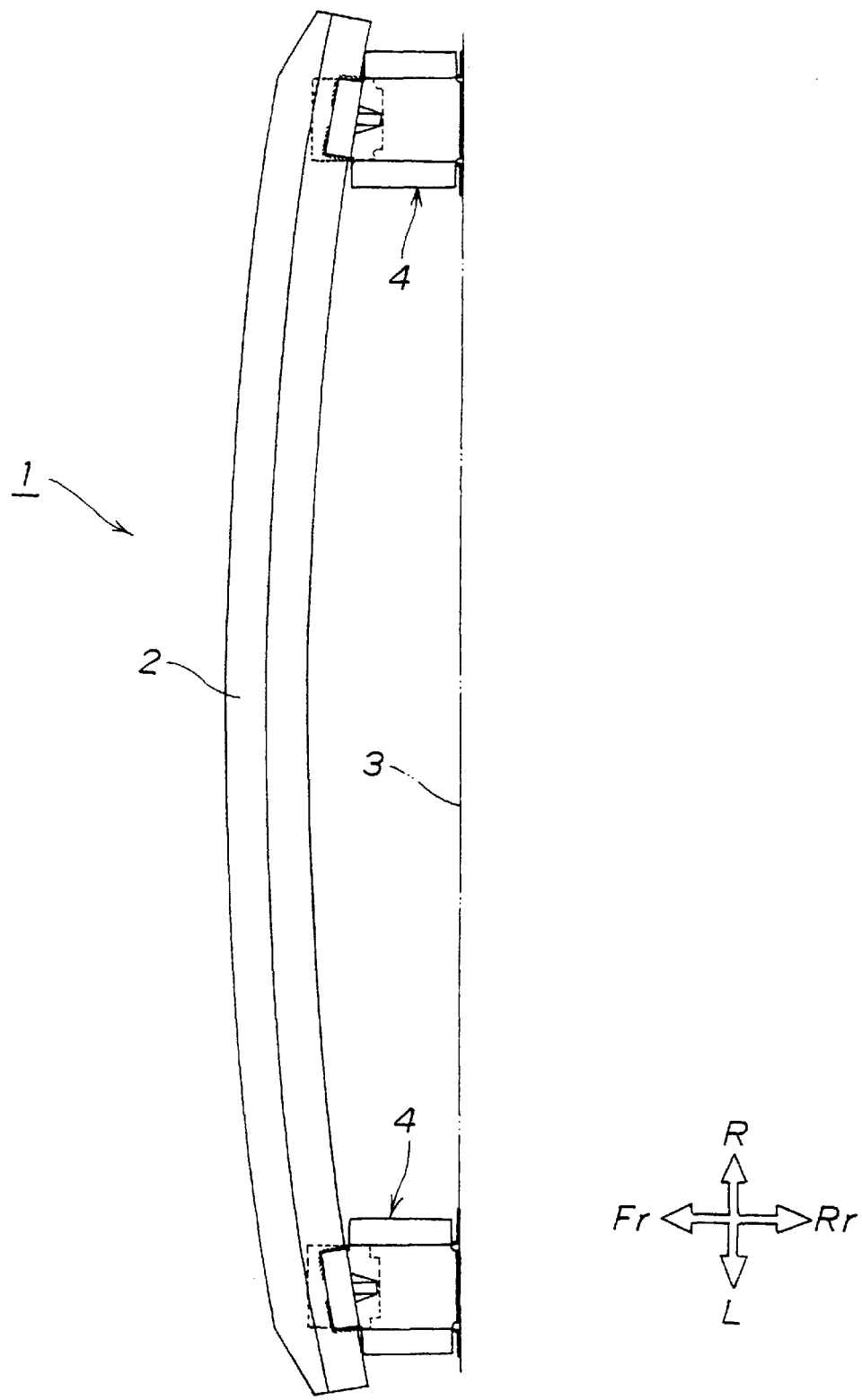
FIG. 1 is a top view of a vehicle bumper mounting structure of the present invention.

In the drawing, the expressions "front", "rear", "left", "right", "top", and "bottom" represent respective directions as viewed from a driver. Also, the signs "Fr", "Rr", "L", "R" and "CL" respectively represent the front side, rear side, left side, right side and center of a vehicle.

Referring to FIG. 1, a bumper 1 comprises a bumper beam 2 extending transversely of the vehicle (vertical direction in the figure), a bumper face covering the front portion of the bumper beam 2 (to be described below relative to FIG. 3), and supports 4, 4 for securing vehicle-widthwise ends of the bumper beam 2 to the chassis 3, and, in the illustrated embodiment, is designed as a front bumper to be mounted to the front portion of the chassis 3. The bumper beam 2 has an arc-like configuration curved forward.

Figure 2:
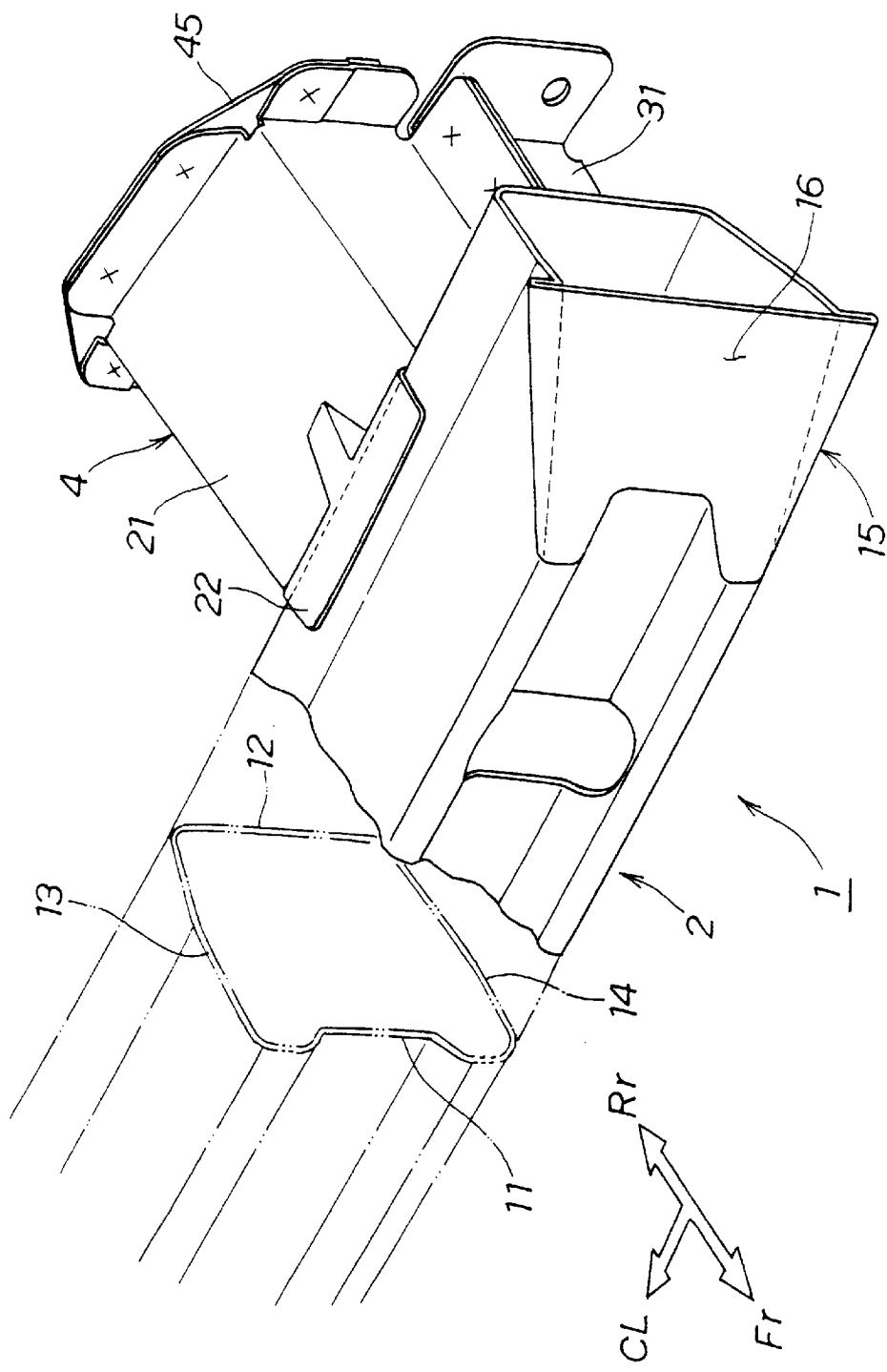
FIG. 2 is an enlarged perspective view of a vehicle bumper mounting structure of the present invention.

Next, reference is made to FIG. 2 showing a left mounting structure of the bumper beam 2 in the vehicle width direction. The vehicle bumper mounting structure is symmetric on the right and left sides. Although only the left side is described below, it goes without saying that the right side also performs the same function.

Since the bumper beam 2 is formed as a rectangular hollow body made of high-tension steel, it has improved collision-energy absorption characteristic and energy transfer characteristic with respect to the chassis and is light in weight.

High-tension steel has a large tensile strength and is manufactured with weldability and machinability in view. The high-tension steel includes, for example, cold rolled steel for vehicle structure (AISI*120XF). "AISI" represents the Steel Founders Society of America.

The bumper beam 2, as shown by an imaginary line in FIG. 2, has a generally rectangular hollow cross section formed by a front portion 11, rear portion 12, top portion 13, and bottom portion 14, the front portion 11 having a corner portion 15 with a sloped (tapered) surface 16 at both ends in the vehicle widthwise direction.

Figure 3:
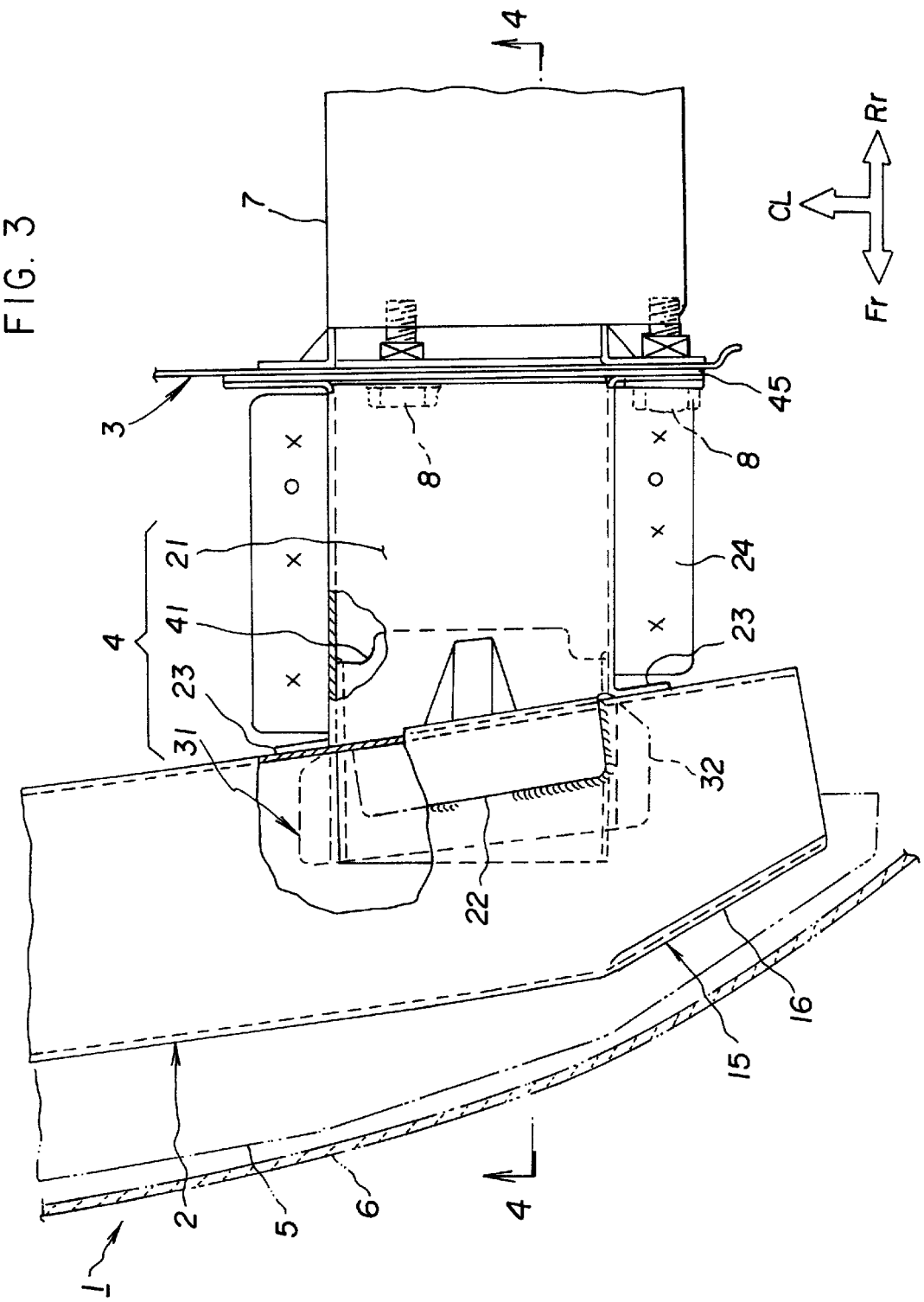
FIG. 3 is an enlarged top view of a vehicle bumper mounting structure of the present invention.

As shown in FIG. 3, the front portion of the bumper beam 2 is covered with a shock-absorbent or cushion 5, which in turn is covered with a bumper face 6.

The cushion 5 absorbs a collision energy and is made of, for example, a polypropylene foam material. The bumper face 6 is provided to improve the appearance of the bumper and is made of, for example, a synthetic resin.

Figure 4:
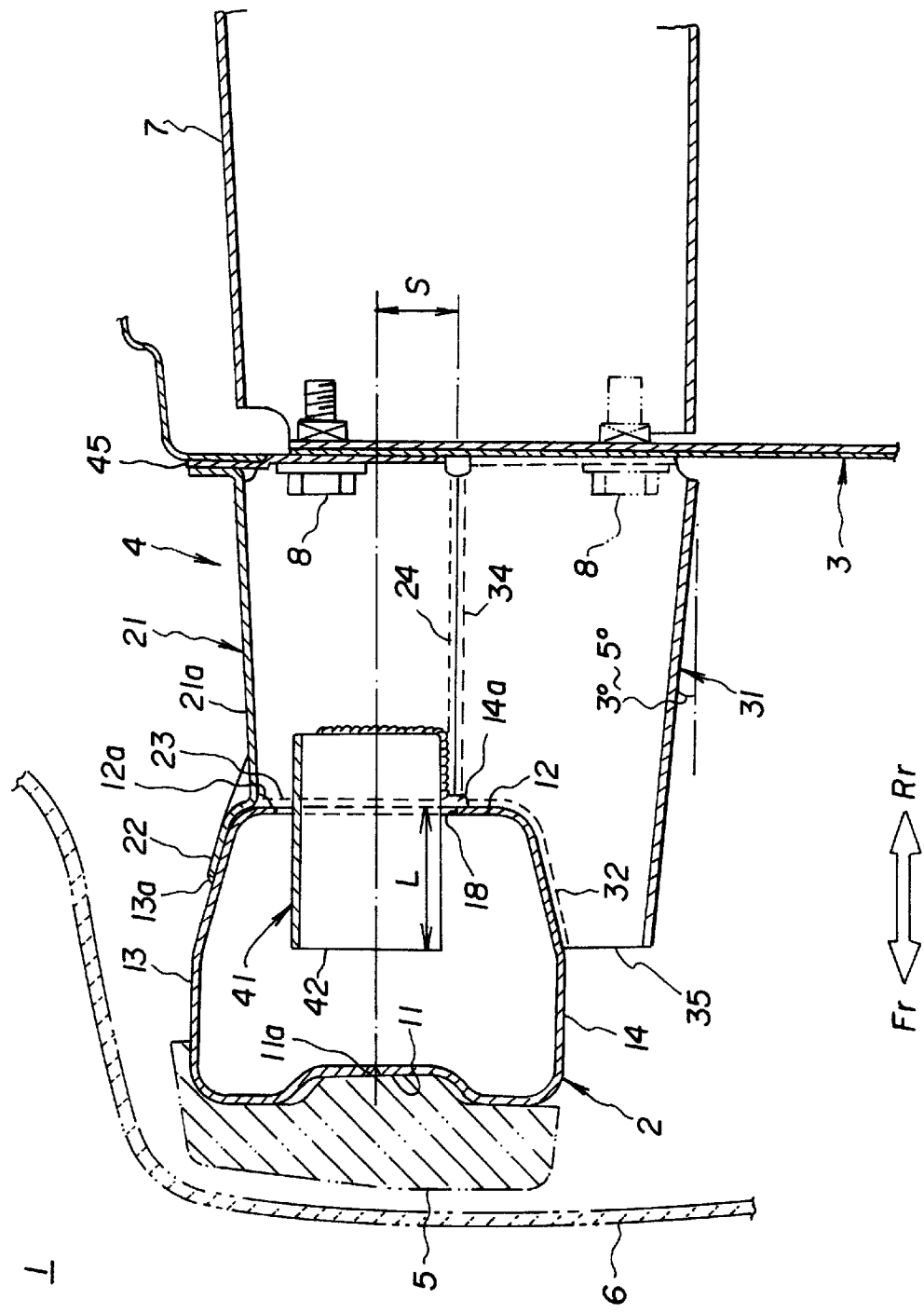
FIG. 4 is a sectional view taken along line 4—4 of FIG. 3.

Referring now to FIG. 4, the bumper beam 2 is formed by folding a steel plate and welding 11a at the center of the front portion 11 of the bumper beam 2 in a heightwise direction. The support 4 is constituted by placing an upper first split half 21 upon a lower split half 31. The front end of the support 4 is joined with the bumper beam 2 by a weld 13a while the base end of the support is joined with a side frame 7 of the chassis 3 by bolts 8 and 8. A side frame 7 extends longitudinally of the chassis 3 at both sides of the chassis 3 to form part of the chassis 3.

Stated otherwise, the first split half 21 has at its front top end a flange 22 welded at 13a to an upper side 13 of the bumper beam 2 and at its lateral front end a flange 23 welded as at 12a to the rear portion 12 of the bumper beam 2. The second split half 31 has at its front end a flange 32 welded as at 14a along the bottom portion 14 of the bumper beam 2.

The first split half 21 comprises a main body 21a and a separate extension member 41 (front end) extending from the front end center of the body, which extension member 41 is weld connected to the main body of the first split half 21. The extension member 41 forms part of the front end of the main body 21a. The extension member 41 is inserted into the bumper beam 2 through an opening 18 formed on the rear portion 12 of the beam 2 in such a manner that it does not touch any part of the bumper beam 2.

The depth or length of insertion L of the extension member 41 into the bumper beam 2 is arranged to be such that the front end (working point) 35 of the second split half 31 becomes flush with the front end (working point) 42 of the extension member 41 in a longitudinal direction of the vehicle.

Thus, by inserting the extension member 41 (front end of the first split half 21) into the bumper beam 2 through the opening 18 and arranging the front end of the second split half 31 to extend along the bottom portion 14 of the bumper beam 2, the bumper beam 2 is inevitably offset in a height direction with respect to the side frame 7. The offset distance between the center of the side frame 7 and that of the bumper beam 2 is S. In other words, the shapes and dimensions of the opening 18 of the bumper beam 2, front end of the second split half 31, and the extension member 41 are selected taking into consideration the offset distance S of the bumper beam 2.

Moreover, the support 4 is tilted such that the top portion and bottom portion (the top portion of the first split half 21 and the bottom portion of the second split half 31) of the support approach each other toward the bumper beam 2, the tilt angle being in the range of 3° to 5°.

Figure 5:
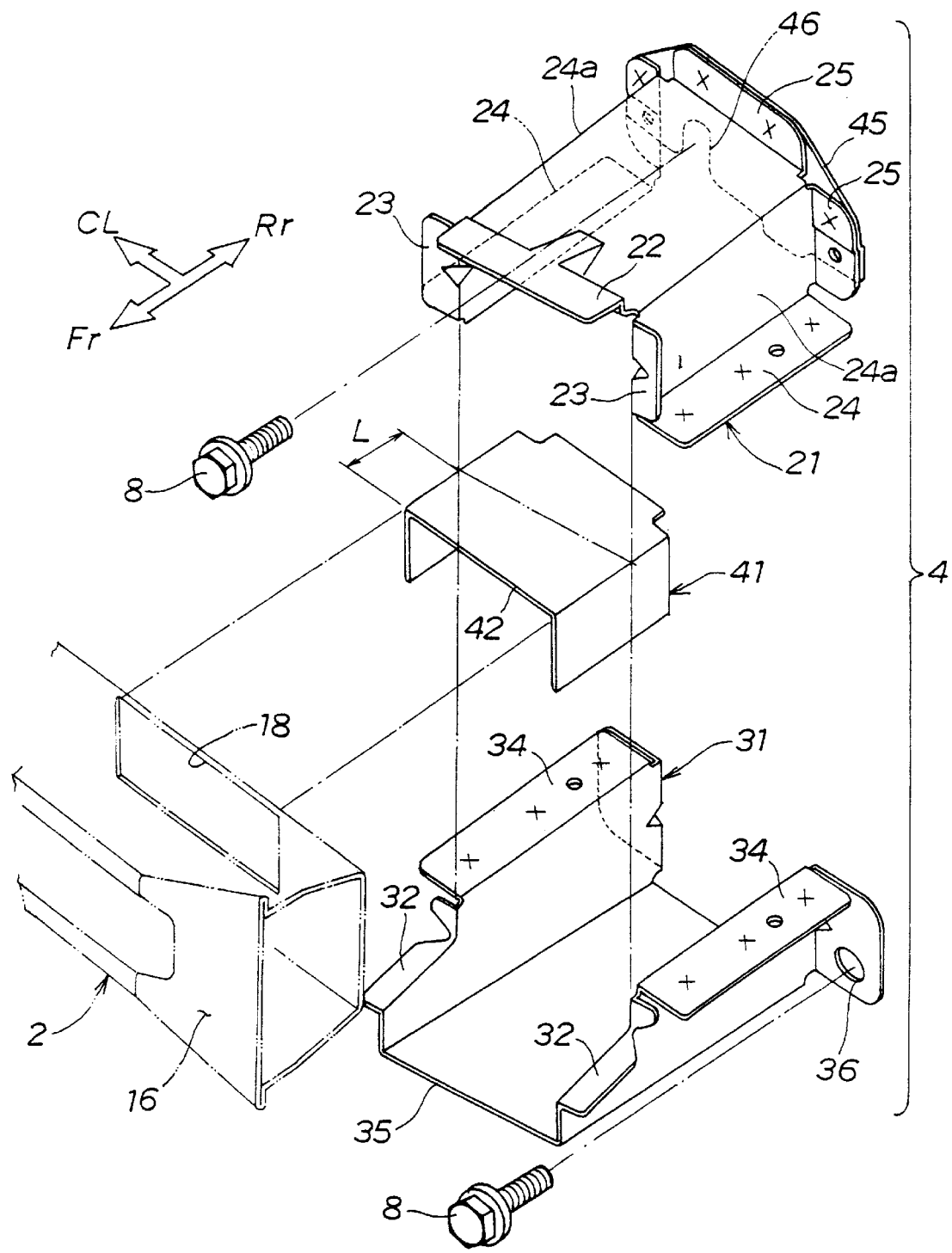
FIG. 5 is an exploded perspective view of a support of the present invention.

As shown in FIG. 5, the support 4 is in the form of a box resulted from superimposing the first split half 21 with a downward-oriented channel cross section upon the second split half 31 with an upward-oriented channel cross section.

The first split half 21 and the second split half 31 has flanges 24 and 34 to be mated and spot welded together. The extension member 41 has a downward-oriented channel cross section and is fitted between side walls 24a and 24a of the first split half 21 and weld connected.

Designated by reference numeral 45 is a back plate for blocking the base end of the first split half 21, which is connected to a peripheral flange 25 of the first split half 21 by spot welding. Reference numerals 36 and 46 represent bolt holes for inserting bolts 8, 8 therethrough.

Next, the assembling procedure of the above support is described having reference to FIG. 5.

First, the extension member 41 is fitted into the inside of the first split half 21 in a superimposed fashion and connected thereto by spot welding, with the top end thereof extended by the length of insertion L from the front end of the first split half 21. Then, the back plate 45 is superimposed on the flange 25 of the first split half 21 and connected by spot welding.

Thereafter, the first split half 21 is superimposed on the second split half 31, followed by weld connecting the flanges 24 and 34 together to thereby complete the support 4.

Finally, the support 4 is pressed against the rear portion of the bumper beam 2 while inserting the extension member 41 into the opening 18 of the bumper beam 2, whereafter the flanges 22, 23, and 32 are weld connected to the bumper beam 2 to complete the assembling.

The support 4 thus assembled is secured to the front end of the side frame 7 shown in FIG. 4 by a bolt.

The above mode of assembling the support 4 has been described to merely assist the understanding of the above inventive arrangement. Other modes of assemblage may also be employed.

Figure 6:
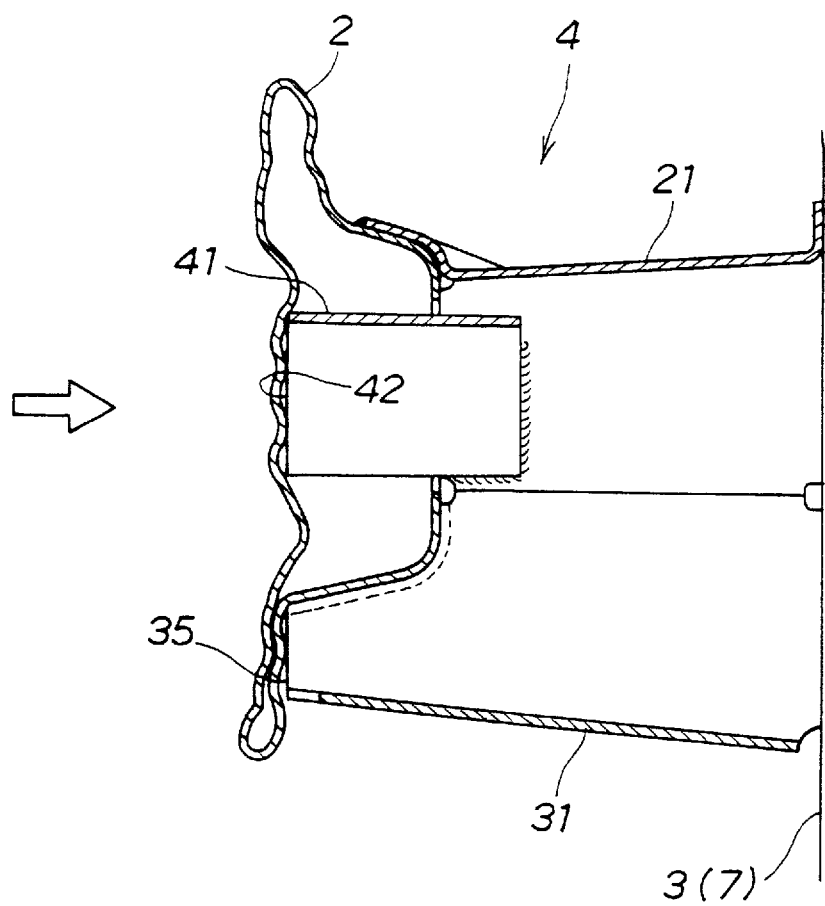
FIG. 6 is a working diagram of a vehicle bumper mounting structure of the present invention.

Operation of the vehicle bumper mounting structure constructed as above will now be explained having reference to FIGS. 4 and 6.

When a small collision energy resulting from a low-speed (approx. 8 km/hr or less) collision acts upon the bumper 1 from the front portion of the vehicle under the state shown in FIG. 4, the collision energy is absorbed due to elastic deformation of the cushion 5 and the bumper beam 2. The bumper beam 2 does not encounter plastic deformation under such level of collision energy. When the collision energy disappears, the cushion 5 returns to its original state.

When a large collision energy acts upon the bumper 1 from the front portion of the vehicle, the bumper beam undergoes plastic deformation in correspondence to the magnitude of the collision energy. When the bumper beam 2 is greatly deformed as shown in FIG. 6, the deformed bumper beam 2 collides with the extension member 41.

At this point in time, the collision energy acts upon the first split half 21 through the extension member 41 and also acts upon the front end of the second split half 31. Thus, since the working points 35 and 42 of the collision energy to the first split half 21 and the second split half 31 become the same, the collision energy works almost uniformly. Therefore, although the bumper beam 2 is offset in the height direction with respect to the side frame 7, the collision energy is quickly and uniformly transferred to the front end of the side frame 7. Moreover, the collision energy transferred to the side frame 7 is absorbed by the chassis 3.

In the above-described embodiment, the bumper 1 is described as a front bumper. However, the bumper arrangement can also be applied to a rear bumper to be mounted to the rear of the chassis 3.

Although the bumper beam 2 is described as being offset in the height direction relative to the side frame 7, it is also possible to arrange the beam 2 to be offset downward, in which instance, the first split half 21 and the second split half 31 are vertically inversely superimposed with the front end of the second split half 31 arranged to extend along the top portion 13 of the bumper beam 2.

As described above, the present invention uses a bumper beam formed into a hollow body made of high-tension steel and a support whose front end extends forward beyond the rear portion of the bumper beam. Therefore, when a large collision energy works on the lightweight bumper beam formed into a hollow body made of high-tension steel, it is possible to quickly transfer the collision energy to a vehicle chassis the front end of the beam.

What is claimed is:

1. A vehicle bumper mounting structure comprising:
   a bumper beam extending transversely of a vehicle and mounted to a chassis through a support, wherein said bumper beam is covered with a bumper face, said bumper beam is comprised of a hollow body made of high-tension steel, and said bumper beam has a front portion, a rear portion and top and bottom portions joining said front and rear portions and forming said hollow body;
   said support has a front end extending forward beyond said rear portion of said bumper beam, said front end of said support being spaced from said front portion of said bumper beam for allowing plastic deformation of said bumper beam corresponding to a magnitude of collision energy when collision acts upon a bumper of said vehicle from a front of said bumper;
   wherein said rear portion of said bumper beam has an opening and said front end of said support is inserted into said hollow body of said bumper beam through said opening; and
   wherein said support has a top portion and a bottom portion tilted to approach each other toward said bumper beam.

2. A vehicle bumper mounting structure for mounting a bumper bean to a side frame of a chassis through a support, wherein
   said support is formed by vertically mating a first slit half and a second slit half together,
   said support is mounted to a front end of a side frame of a chassis,
   a front end of said first slit half is inserted into said bumper beam, having a front portion, a real portion and top and bottom portions joining said front and rear portions and formed into a hollow body made of high-tension steel, through an opening in said rear portion of the beam, said front end of said first slit half being spaced from said front portion of said beam,
   said first slit has a front end portion mounted along one of said top portion and said bottom portion of bumper beam,
   said second slit half has a front end portion mounted along the other of said top portion and said bottom portion of said bumper beam, and said bumper beam is mounted to said side frame through said support so as to be offset in a height direction with respect to said side frame.

3. A vehicle bumper mounting structure according to claim 2, wherein
   said second slit half of said support is joined with said first slit half.

4. A vehicle bumper mounting structure according to claim 2, wherein
   said support has a top portion and a bottom portion tilted to approach each other toward said bumper beam.

5. A vehicle bumper mounting structure comprising:
   a bumper having a bumper beam extending transversely of a vehicle and a bumper face covering at least a front side of said bumper beam;
   a support through which said bumper beam is mounted to a chassis of said vehicle;
   wherein said bumper beam is comprised of a hollow body made of high-tension steel and has a front portion, a rear portion, and top and bottom portions joining said front and rear portions to jointly form said hollow body, said rear portion having an opening; and
   wherein said support has a front end inserted into said hollow body of said bumper beam through said opening in said rear portion of said bumper beam, said front end of said support being spaced from said front portion of said bumper beam for allowing plastic deformation of said bumper beam corresponding to a magnitude of collision energy when a collision force acts upon said bumper from a front of said bumper, said support further having a front portion mounted along one of said top portions and said bottom portion of said bumper beam.

6. The vehicle bumper mounting structure according to claim 5, wherein said support has a hollow box-shaped structure and is comprised of a pair of generally channel-shaped first and second slit halves mated together in vertical orientation to form said hollow box-shaped structure, and generally channel-shaped extension connected to one of said first and second slit halves, each of said slit halves having a front portion mounted along one of said top and bottom portions of said bumper beam and forming said front portion of said bumper beam, said extension being partly received in said hollow body of said bumper beam through said opening in said rear portion of said bumper beam and having a front end spaced from said front portion of said bumper beam, said front end of said extension forming said front end of said support.

7. The vehicle bumper mounting structure according to claim 6, wherein at least one of said first and second slit halves has a front end extending flush with said front end of said support.

8. The vehicle bumper mounting structure according to claim 5, wherein said support has a top portion and a bottom portion tilted to approach each other toward said bumper beam.

* * * * *